Patented Aug. 2, 1927.

1,637,639

UNITED STATES PATENT OFFICE.

ORLIE A. HAWKINS, OF LAMAR, COLORADO.

MANUFACTURE OF BROOMS.

No Drawing. Application filed December 10, 1925. Serial No. 74,628

This invention relates to brooms and the primary object of the invention is the provision of means by which brooms can be made out of another raw material besides broom corn, the said material being heretofore considered as a waste substance.

The material used is much tougher and more durable than broom corn, and will outlast two brooms, made of broom corn; it is especially adapted to making push brooms, and can be mixed with broom corn, increasing durability.

It is therefore another prime object of the invention to construct brooms from a material growing abundantly in a wild uncultivated state on the western prairies, commonly known as soap weed or bear grass and technically known as yucca and thus materially decrease the cost of manufacture of brooms.

It has been found by numerous experiments that the blades stripped from the yucca plant will serve admirably as straws for brooms and when treated, by a method forming a part of this invention will be more durable and efficient than broom straws.

A further object of the invention is to provide an improved method of treating the blades of the yucca plant consisting of drying the blades to add the necessary toughness thereto and then splitting the blades to the desired shape.

The weed consists of a heavy center stalk, out of which, up and down the sides thereof branch the blades which I contemplate making the brooms out of. The blades are straight, flat, sword-shaped, rather tough and are probably three-quarters of an inch wide and averaging about eighteen inches in length.

After the blades have been gathered, the same are placed upon a suitable carrier and very slowly run through a kiln heated to a high temperature. This dries the blades and when the same emerge from the kiln, they are nearly as tough as rattan.

The next step in the process, after the blades leave the kiln is to flatten the same out on a suitable platform, and then feed the same to a machine, which presses and pulls the blades both transversely and longitudinally and cuts the same longitudinally into strips of substantially equal widths. The blades are squeezed and pulled according to the texture thereof.

These straws or strips are then bound and made into a broom, in the ordinary manner, now used, when brooms are made out of broom corn.

From the foregoing description it can be seen that I have found a material for making brooms, which was heretofore considered as waste material and never used for any purpose at all and which when treated by my process above described gives the same a better result than broom corn.

Changes in details may be made without departing from the spirit or the scope of this invention.

What I claim as new is:—

1. The method of treating the blades of the yucca plant for forming straws to permit the same to be used in the manufacture of brooms, baskets and the like, which consists of subjecting the blades to a high temperature so as to dry the same, then flattening out the blades, and finally cutting the same into strips of substantially the same width.

2. The method of treating the blades of the yucca plant for forming straws for use in the manufacture of brooms, baskets and the like, which consists in subjecting the blades to a high temperature so as to dry the same, then flattening the blades, then pulling and squeezing the blades and finally splitting the blades longitudinally.

In testimony whereof I affix my signature.

ORLIE A. HAWKINS.